US010372946B1

(12) United States Patent
See

(10) Patent No.: US 10,372,946 B1
(45) Date of Patent: Aug. 6, 2019

(54) SYSTEMS AND METHODS FOR CONFIGURING A SECURE COMPUTING ENVIRONMENT ON AN INTEGRATED CIRCUIT

(71) Applicant: Altera Corporation, San Jose, CA (US)

(72) Inventor: Chin Liang See, Sungai Pinang (MY)

(73) Assignee: Altera Corporation, San Jose, CA (US)

( * ) Notice: Subject to any disclaimer, the term of this patent is extended or adjusted under 35 U.S.C. 154(b) by 348 days.

(21) Appl. No.: 15/295,785

(22) Filed: Oct. 17, 2016

(51) Int. Cl.

| | |
|---|---|
| ***G06F 21/76*** | (2013.01) |
| ***G06F 21/50*** | (2013.01) |
| ***G06F 21/85*** | (2013.01) |

(52) U.S. Cl.
CPC .............. *G06F 21/76* (2013.01); *G06F 21/50* (2013.01); *G06F 21/85* (2013.01)

(58) Field of Classification Search
CPC ........... G06F 21/50; G06F 21/85; G06F 21/76
See application file for complete search history.

(56) References Cited

U.S. PATENT DOCUMENTS

| | | | | |
|---|---|---|---|---|
| 5,880,523 | A | 3/1999 | Candelore | |
| 8,479,260 | B2 * | 7/2013 | Price | G06F 21/30 726/3 |
| 9,652,570 | B1 * | 5/2017 | Kathail | G06F 17/505 |
| 2007/0294745 | A1 * | 12/2007 | Tan | G06F 21/74 726/2 |
| 2013/0291057 | A1 * | 10/2013 | Slyfield | G06F 21/50 726/1 |

OTHER PUBLICATIONS

Yashu Gosain et al., “TrustZone Technology Support in Zynq-7000 All Programmable SoCs,” White Paper: Zynq-7000 All Programmable SoCs, May 20, 2014, pp. 1-11.

* cited by examiner

*Primary Examiner* — Hee K Song
(74) *Attorney, Agent, or Firm* — Steven J. Cahill

(57) ABSTRACT

A method of dividing a set of components of an integrated circuit is disclosed. Two or more different security labels are assigned to two or more non-overlapping subsets of the set of components. A handoff file is generated based on the non-overlapping subsets and sent to the integrated circuit. The set of components of the integrated circuit is divided according to the non-overlapping subsets based on the system handoff file.

20 Claims, 7 Drawing Sheets

100
First subset
408
412A
412B
First OS
416
Second subset
410
414A
414B
Second OS
418
Secure Monitor
420
424
422
426
300
Processor
304
Secure Environment Configuration Application
406

SYSTEMS AND METHODS FOR CONFIGURING A SECURE COMPUTING ENVIRONMENT ON AN INTEGRATED CIRCUIT

FIELD OF THE DISCLOSURE

The present disclosure relates to electronic circuits, and more particularly, to systems and methods for configuring a secure computing environment on an integrated circuit.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many applications that may be executed on an integrated circuit, for example a System on Chip (SoC), require ensuring comprehensive security and establishing a trusted platform. Certain architecture solutions provide the ability to partition or segregate subsets of hardware on the SoC into normal world (non-secure) and secure world environments.

SUMMARY

Embodiments described herein include a method of dividing a set of components of an integrated circuit. It should be appreciated that the embodiments can be implemented in numerous ways, such as a process, an apparatus, a system, a device, or a method. Several embodiments are described below.

In one embodiment, a method of dividing components of an integrated circuit is disclosed. The method may include an operation to receive information regarding first and second non-overlapping subsets of the set of components using a computer-implemented application. The information may indicate that each component in the first non-overlapping subset was assigned to a first security label by a user of the computer-implemented application. The information may further indicate that each component in the second non-overlapping subset was assigned to a second security label by the user. The method may further include an operation to generate a first system handoff file based on the information regarding the first and second non-overlapping subsets using the computer-implemented application. The method may also include an operation to send the first system handoff file to a system monitor of the integrated circuit using the computer-implemented application. The method may include an operation to divide the set of components of the integrated circuit according to the first and second security labels based on the first system handoff file using the system monitor.

In another embodiment, a method of assigning a plurality of security labels to a set of components of an integrated circuit is disclosed. The method may include an operation to receive an interactive system design depicting the set of components using the computer-implemented application. The method may further include a method to select a first security label of the plurality of security labels in response to user input using the computer-implemented application. The method may also include an operation to assign the first security label to a first subset of the set of components on the interactive system design using the computer-implemented application. The method may include an operation to select a second security label of the plurality of security labels in response to user input using the computer-implemented application. The method may further include an operation to assign the second security label to a second subset of the set of components on the interactive system design using the computer-implemented application. The method may also include an operation to generate a system design for the integrated circuit based on the first and second subsets of the set of components using the computer-implemented application.

Further features of the invention, its nature, and various advantages will be more apparent from the accompanying drawings and the following detailed description of the preferred embodiments.

DETAILED DESCRIPTION OF THE DRAWINGS

Figure 1:
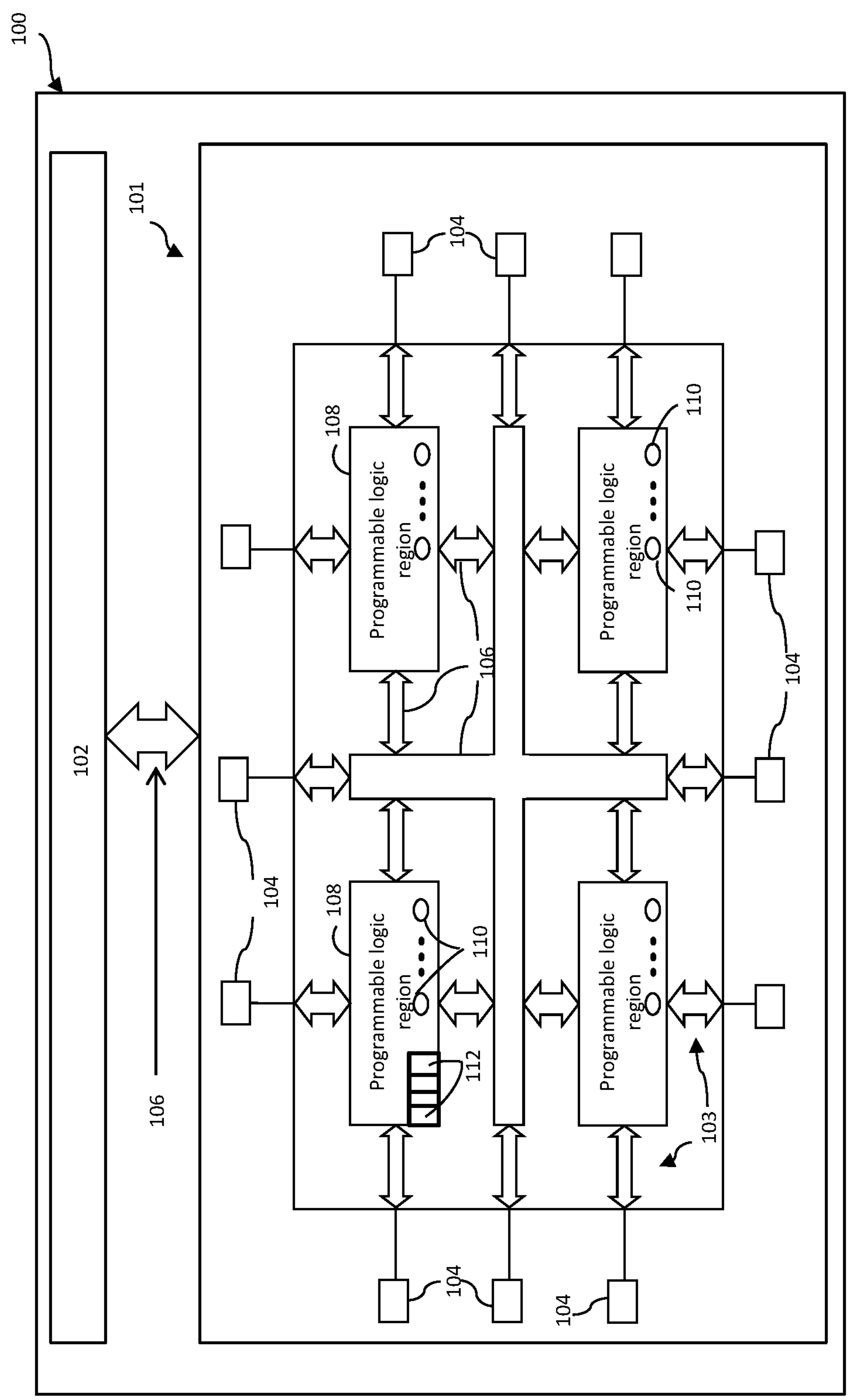
FIG. 1 illustrates an exemplary integrated circuit in accordance with an embodiment of the present invention.

Embodiments of the present invention relate to integrated circuits with logic circuitry. The integrated circuits may be any suitable type of integrated circuit, such as microprocessors, application-specific integrated circuits, digital signal processors, memory circuits, or other integrated circuits. If desired, the integrated circuits may be programmable integrated circuits that contain programmable logic circuitry. The present invention will generally be described in the context of integrated circuits such as programmable logic device (PLD) integrated circuits as an example. In the following description, the terms ‘circuitry’ and ‘circuit’ are used interchangeably.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of other features. However, any individual feature may not address any of the problems discussed above or might only address one of the problems discussed above. Some of the problems discussed above might not be fully addressed by any of the features described herein.

The following description discusses ensuring comprehensive security solutions and establishing trusted operational platforms for integrated circuits by means of secure partitioning and proper hardware configuration. This requires establishing normal world and secure world operating environments. The "normal world" (non-secure environment), that is created and enforced, is typically a statically defined hardware subset of the SoC. The idea behind establishing a normal world (or non-secure environment) ensures that a non-secure processor or master can access only non-secure (NS) devices and receive only non-secure interrupts. For example, a normal world hardware subset might include a Universal Asynchronous Receiver Transmitter (UART), Ethernet, and Universal Serial Bus (USB) interfaces, but may exclude Controller Area Network (CAN) controller access. The CAN might instead be dedicated to the secure world where a separate real time operating system (RTOS) or other secure application may run, for example for the sole purpose of managing CAN traffic, independent of the normal world applications.

Software that runs in the normal world is assumed to be flawed from a safety and security perspective. That is, normal world software is expected to contain bugs, exploits, hacks, faults, or irregularities that could expose sensitive information or functions. Thus, it is essential to isolate the secure world processing area where sensitive data storage or functions are managed away from the normal world software.

Unlike the hardware subset in which normal world software runs, software running within the secure world may have complete access to the hardware resource of a SoC. Thus, secure software has access to all resources associated with both the secure and normal worlds. In certain implementations, secure software may only have access to secure world hardware.

Partitioning a system into normal world and secure world can also be understood as establishing a "trusted execution environment" (TEE). TEE refers to software running within the secure world and the communications that allow that secure software to interact with the normal world software. TEE software typically consists of a small operating system and its applications, and APIs, which allow the secure software to communicate with the (sometimes) larger, user-centric software (Android, Linux, etc.).

FIG. 1 illustrates an example integrated circuit 100 in accordance with an embodiment of the present invention. In FIG. 1, integrated circuit 100 may include processing circuitry 102 communicatively coupled to a programmable logic device (PLD) circuit 101 via interconnection circuitry 106. Processing circuitry 102 may be a central processing unit (CPU), a microprocessor, a floating-point coprocessor, a graphics coprocessor, a hardware controller, a network controller, a Reduced Instruction Set Computing (RISC) based processor such as an Acorn RISC Machine (ARM) processor, or other processing unit. PLD circuit 101 may include input-output circuitry 103 for driving signals off of PLD circuit 101 and for receiving signals from other devices via input-output pins 104. Interconnect circuitry 106 may include interconnection resources such as global and local vertical and horizontal conductive lines and buses may be used to route signals on PLD circuit 101. The interconnect circuitry 106 includes conductive lines and programmable connections between respective conductive lines and is therefore sometimes referred to as programmable interconnects.

The interconnect circuitry 106 may form a network-on-chip (NOC). A NOC may be a system of interconnect resources such as multiplexers and de-multiplexers that applies general networking technologies to connect the processing circuitry 102 with PLD circuit 101 and to route signals on PLD circuit 101. The NOC may perform network communication functions. For example, the NOC may perform routing functions, gateway functions, protocol or address translation, and security functions.

PLD circuit 101 may include programmable logic regions 108 that can be configured to perform a custom logic function. Each programmable logic region 108 may include combinational and sequential logic circuitry. The interconnect circuitry 106 may be considered to be a type of programmable logic 108.

PLD circuit 101 may also contain programmable memory elements 110. Programmable memory elements 110 can be loaded with configuration data (also called programming data) using pins 104 and input-output circuitry 103. Once loaded, the programmable memory elements 110 may each provide a corresponding static control signal that controls the operation of an associated logic component in programmable logic 108. In a typical scenario, the outputs of the loaded programmable memory elements 110 are applied to the gates of metal-oxide-semiconductor transistors in programmable logic 108 to turn certain transistors on or off and thereby configure the logic in programmable logic region 108 and routing paths. Programmable logic circuit elements that may be controlled in this way include pass transistors, parts of multiplexers (e.g., multiplexers used for forming routing paths in interconnect circuitry 106), look-up tables, logic arrays, various logic gates, etc.

Programmable memory elements 110 may be implemented using any suitable volatile and/or non-volatile memory structures such as random-access-memory (RAM) cells, fuses, antifuses, programmable read-only-memory memory cells, mask-programmed and laser-programmed structures, resistive memory structures, combinations of these structures, etc. Because programmable memory elements 110 are loaded with configuration data during programming, programmable memory elements 110 are sometimes referred to as configuration memory, configuration RAM (CRAM), or programmable memory elements.

The circuitry of PLD circuit 101 may be organized using any suitable architecture. As an example, the logic of PLD circuit 101 may be organized in a series of rows and columns of larger programmable logic regions 108 each of which contains multiple smaller logic blocks 112. The smaller logic blocks may be, for example, regions of logic that are sometimes referred to as logic elements (LEs), each containing a look-up table (LUT), one or more registers, and programmable multiplexer circuitry. The smaller regions may also be, for example, regions of logic that are sometimes referred to as adaptive logic modules (ALMs). Each adaptive logic module may include a pair of adders, a pair of associated registers and a look-up table or other block of shared combinational logic (as an example). The larger regions may be, for example, logic array blocks (LABs) containing multiple logic elements or multiple ALMs. In the example of FIG. 1, illustrative smaller logic blocks 112 (which may be, for example, LEs or ALMs) are shown in one of the larger regions of programmable logic 108 in FIG. 1 (which may be, for example, a logic array block). In a typical PLD circuit 101, there may be hundreds or thousands of smaller logic blocks 112. The smaller logic blocks 112 that are shown in FIG. 1 are merely illustrative.

During device programming, configuration data that configures the smaller logic blocks 112 and programmable logic regions 108, so that their logic resources perform desired logic functions on their inputs and produce desired output signals, is loaded into PLD circuit 101. For example, CRAM cells are loaded with appropriate configuration data bits to configure adders and other circuits on PLD circuit 101 to implement desired custom logic designs.

The resources of PLD circuit 101, such as programmable logic 108, may be interconnected by programmable interconnects 106. Programmable interconnects 106 generally include vertical and horizontal conductors. These conductors may include global conductive lines that span substantially all of device 101, fractional lines such as half-lines or quarter lines that span part of PLD circuit 101, staggered lines of a particular length (e.g., sufficient to interconnect several logic array blocks or other such logic areas), smaller local lines, or any other suitable interconnection resource arrangement. If desired, the logic of PLD circuit 101 may be arranged in more levels or layers in which multiple large regions are interconnected to form still larger portions of logic. Still other device arrangements may use logic that is not arranged in rows and columns.

In addition to the relatively large blocks of programmable logic that are shown in FIG. 1, PLD circuit 101 generally also includes some programmable logic associated with the programmable interconnects, memory, and input-output circuitry on PLD circuit 101. For example, input-output circuitry 103 may contain programmable input and output buffers. Programmable interconnects 106 may be programmed to route signals to a desired destination.

Figure 2:
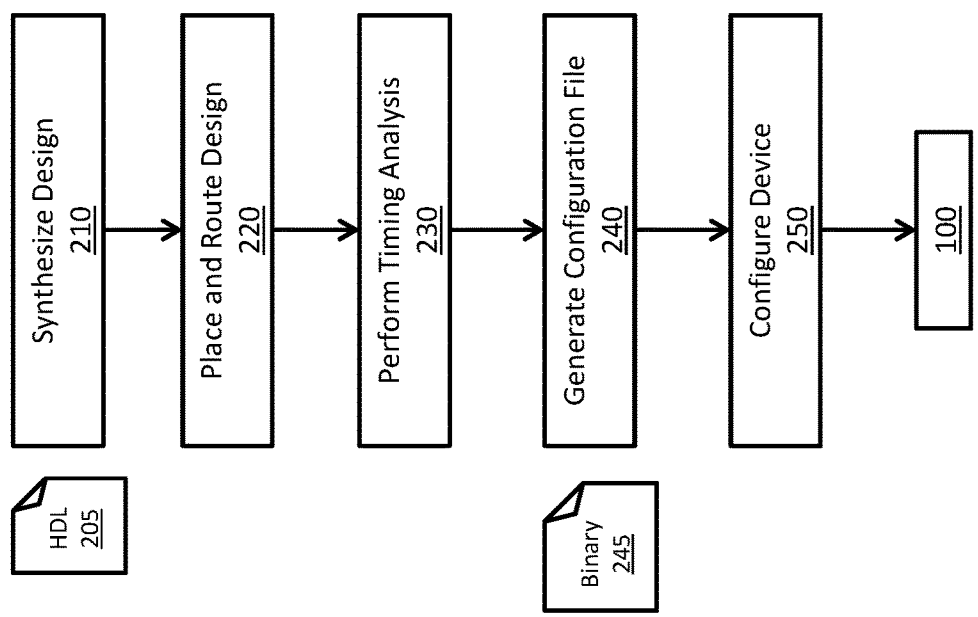
FIG. 2 depicts an illustrative diagram of a method to create and compile a circuit design for an integrated circuit using an electronic design assistant (EDA) tool in accordance with embodiments of the present invention.

FIG. 2 depicts illustrative steps for compiling a circuit design for an integrated circuit using an EDA tool in accordance with embodiments of the present invention. Generally, a circuit designer or engineer may create a circuit design for an integrated circuit, for example integrated circuit 100, that is embodied in hardware description language (HDL) file 205. It should be noted that even though HDL file 205 is shown in FIG. 2, other design input techniques (e.g., input files using other high-level languages, the Open Computing Language (OpenCL) framework, or compilation output based on various models, etc.) may be applicable in this context. The circuit design may be created using the EDA tool or may be provided by the user as an input to the EDA tool.

At step 210, HDL file 205 may be synthesized by the EDA tool. For instance, the synthesis operation performed at step 210 may translate the circuit design embodied in HDL file 205 into a discrete netlist of logic-gate primitives. The synthesized logic gates in the circuit design are then placed and routed on a target integrated circuit 100 at step 220.

After the place and route operation, at step 230, a timing analysis tool (e.g., the EDA tool may include a built-in timing analyzer) may perform a timing analysis operation on the circuit design. It should be appreciated that the timing analysis operation may compute the lengths of different paths in the circuit design and the timing constraints of the overall circuit design. The EDA tool may then generate binary configuration file 245 at step 240. Binary configuration file 245 contains a description of the circuit design and may be used to configure or program the targeted integrated circuit 100 (e.g., contents of binary configuration file 245 are loaded onto integrated circuit 100) at step 250. Alternatively, binary configuration file 245 may contain a description to produce IC masks that can then be used to fabricate the targeted integrated circuit 100.

Figure 3:
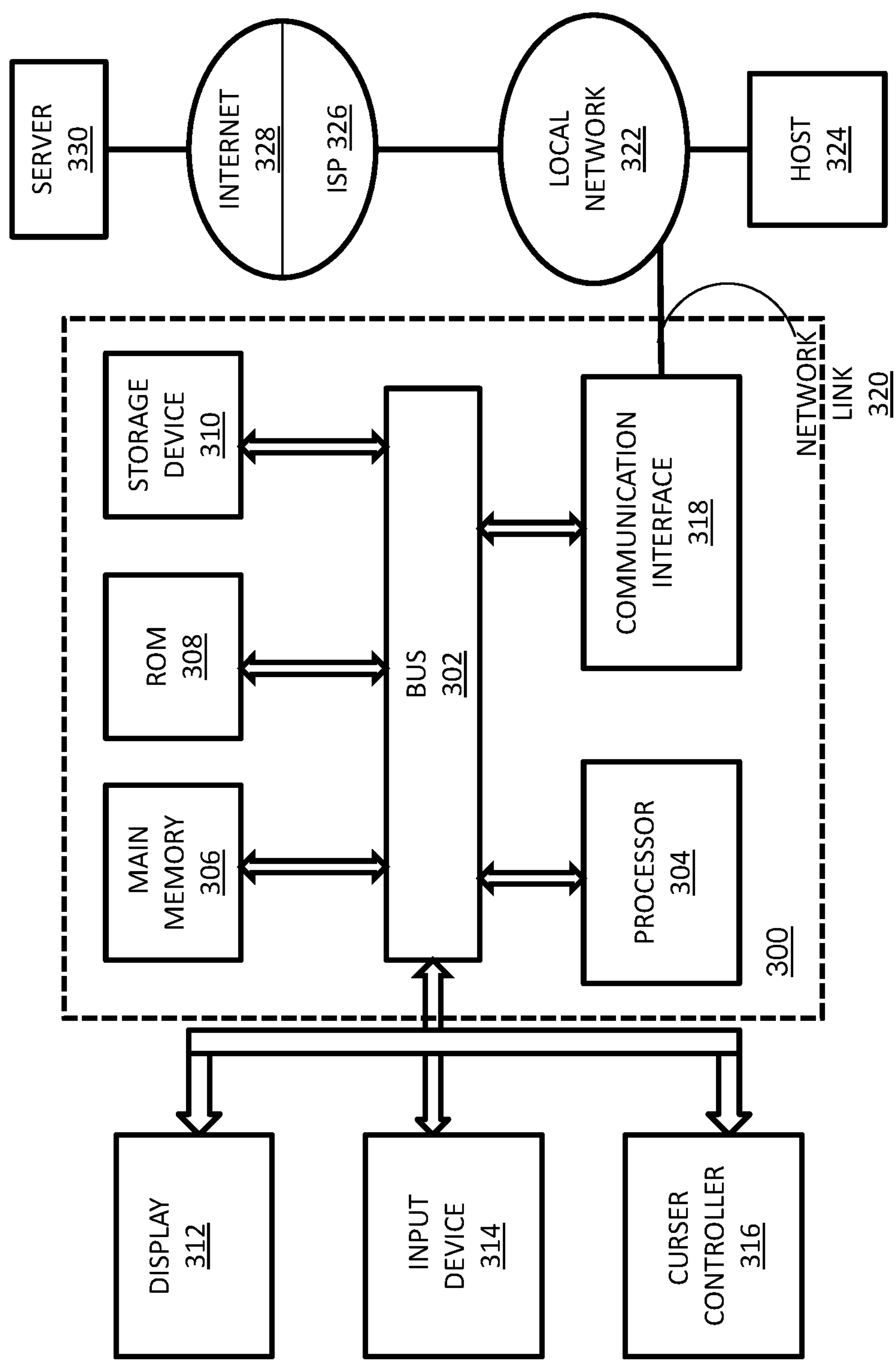
FIG. 3 illustrates an exemplary computer system in accordance with an embodiment of the present invention.

FIG. 3 is a block diagram that illustrates a computer system 300 in accordance with an embodiment of the present invention. In an embodiment, the EDA tool of FIG. 2 may be implemented on a computer system 300. Computer system 300 may include a bus 302 or other communication mechanism for communicating information, and a hardware processor 304 coupled with bus 302 for processing information. Hardware processor 304 may be, for example, a general-purpose microprocessor. In an embodiment, processor 304 may be similar to processing circuitry 102 described above.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, for displaying information to a computer user. An input device 314, including alphanumeric and other keys, is coupled to bus 302 for communicating information and command selections to processor 304. Another type of user input device is cursor controller 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or PLDs as described in FIG. 1, which in combination with the computer system, causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term “storage media” as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Figure 4:
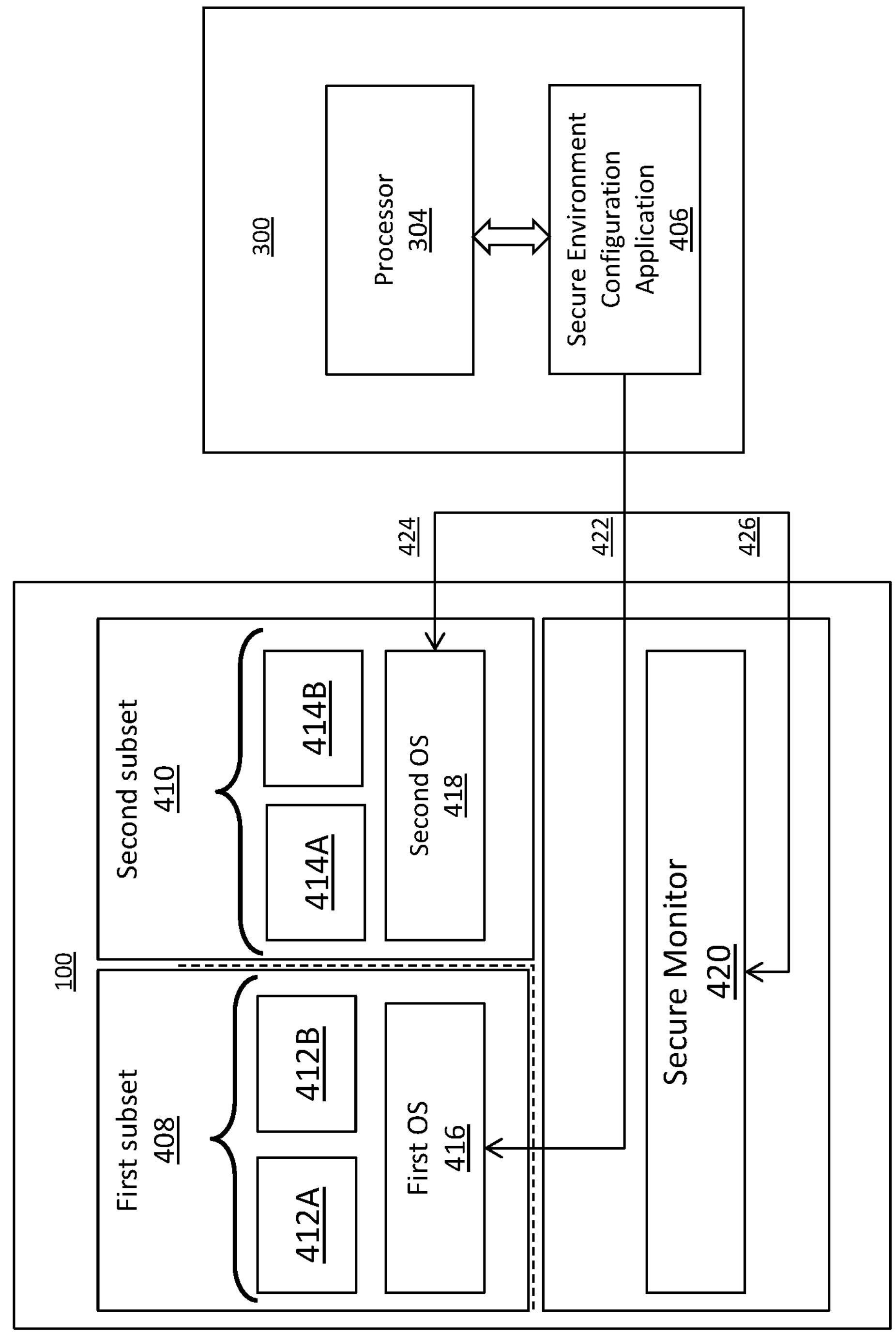
FIG. 4 illustrates an exemplary partitioning of components of an integrated circuit according to different security labels in accordance with an embodiment of the present invention.

FIG. 4 illustrates an exemplary partitioning of components of integrated circuit 100 according to different security labels in accordance with an embodiment of the present invention. For the purpose of illustrating clear examples, FIG. 4 will be discussed in reference to integrated circuit 100 of FIG. 1 and computer system 300 of FIG. 3 and alongside FIG. 5.

In an embodiment, integrated circuit 100 may be communicatively coupled to computer system 300. In an embodiment, integrated circuit 100 is communicatively coupled to computer system 300 via network link 320 described in FIG. 3. In an embodiment, integrated circuit 100 is coupled to computer system 300 via other communication interfaces, for example, USB, Ethernet, and UART.

Computer system 300 may include processor 304 as described above that executes instructions to implement different applications including secure environment configuration (SEC) application 406. In an embodiment, SEC application 406 may be implemented as a sub-module or sub-routine of the EDA tool of FIG. 200. In an embodiment, SEC application 406 may be implemented after the synthesis operation at step 210 of FIG. 2, or the place and route operation at step 220 or the configuration file generation step 240. In an embodiment, SEC application 406 may include a schematic viewer engine that generates an interactive graphical representation of the circuit elements (e.g., logic gates, etc.) and interconnections between them (commonly referred to as a schematic diagram) of integrated circuit 100.

Figure 5:
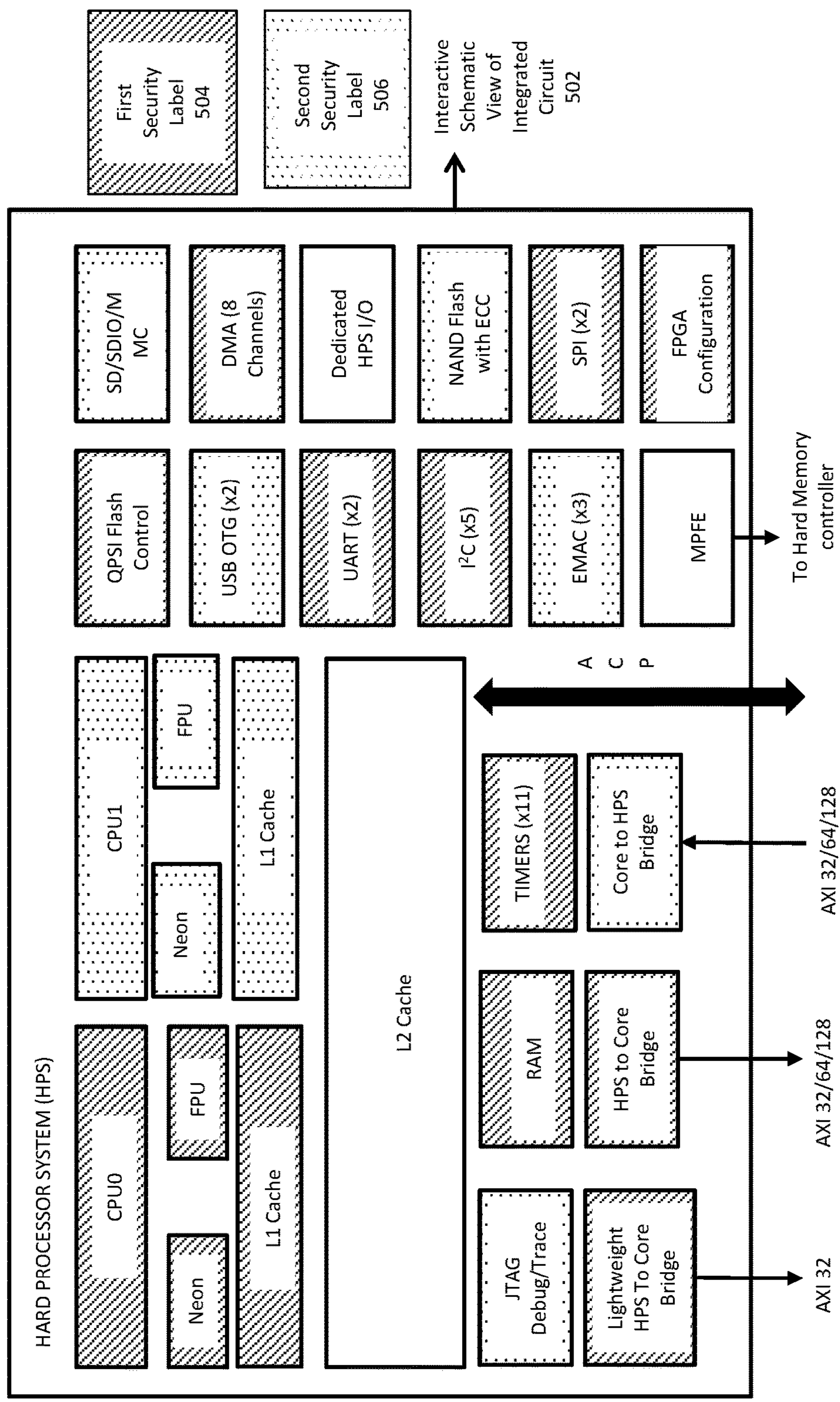
FIG. 5 illustrates an exemplary interactive schematic view of an integrated circuit in accordance with an embodiment of the present invention.

FIG. 5 illustrates an exemplary interactive schematic view of an integrated circuit in accordance with an embodiment of the present invention. In an embodiment, interactive schematic view 502 of integrated circuit 100 generated by SEC application 406 may be used to assign first security label 504 and second security label 506 to different components of integrated circuit 100. In an embodiment, second security label 506 may be associated with higher administrative privileges as compared to first security label 504. In another embodiment, first security label 504 may be associated with higher administrative privileges as compared to second security label 506. For example, in FIG. 5, CPU0 is assigned first security label 504 and CPU1 is assigned second security label 506.

In an embodiment, a user may assign first security label 504 to a first subset of components 408 in IC 100 and second security label 506 to a second set of components 410 in IC 100. In an embodiment, first set of components 408 may include components 412A and 412B. In an embodiment, second set of component 410 may include 414A and 414B. In an embodiment, each security label is associated with a separate set of access permissions for interacting (accessing, managing, or controlling) the set of system components of integrated circuit 100. For example, in FIG. 4, components tagged with first security label 504 may only be allowed to interact with other components tagged with first security label 504. Similarly, components tagged with second security label 506 may be allowed to interact with all components of integrated circuit 100 regardless of security labels.

In an embodiment, security labels may also be assigned to one or more OSs implemented on integrated circuit 100. Similar to individual system components above, in an embodiment, an OS assigned first security label 504 may only be allowed to interact with other components tagged with first security label 504. Similarly, an OS tagged with second security label 506 may be allowed to interact with all components of integrated circuit 100 regardless of security labels. In an embodiment, a first OS 416 in IC 100 is assigned first security label 504 and a second OS 418 in IC 100 is assigned second security label 506 respectively. In an embodiment, first OS 416 and second OS 418 are assigned security labels other than the first and second security labels 504 and 506 respectively. In an embodiment, first OS 416 interacts with first subset 408, whereas second OS 418 interacts with both first subset 408 and second subset 410. In an embodiment, different security labels are associated with different instances of an OS implemented on integrated circuit 100 such that each instance of the OS has a separate set of access permissions for accessing components of integrated circuit 100. In an embodiment, different security labels are associated with different user accounts of an OS implemented on integrated circuit 100 such that each user account has a separate set of access permissions for interacting with components of integrated circuit 100.

In an embodiment, SEC application 406 generates handoff files 422, 424, and 426 after a user has assigned the various security labels to different components of integrated circuit 100. Handoff files 422, 424, and 426 are sent by SEC application 406 to integrated circuit 100. Handoff files 422, 424, and 426 are received and consumed by first OS 416, second OS 418, and bootloader/system monitor 420 respectively. In an embodiment, handoff files 422, 424, and 426 are binary blobs that include information pertaining to security labels assigned to the various components of integrated circuit 100. In an embodiment, handoff file 422 contains information pertaining to components available to first OS 416 (i.e. in first subset 408). In an embodiment, handoff file 424 contains information pertaining to components available to second OS 418 (i.e. in second subset 410). In another embodiment, all three handoff files 422, 424, and 426 contain information pertaining to all components of integrated circuit 100 that may be required to set up a TEE.

In an embodiment, handoff file 426 is received and consumed by bootloader/system monitor 420 prior to first OS 416 and second OS 418 receiving and consuming handoff files 422 and 424 respectively. In an embodiment, bootloader/system monitor 420 loads first OS 416 and second OS 418 and passes software control to the operating systems. In another embodiment, second OS 418 boots first and initiates a secure monitor as a secure gateway between first OS 416 and second OS 418. After the secure monitor starts, it can spawn a second boot loader that in turn starts first OS 416.

For example, a set of system components may need to be partitioned into two subsets on a system on chip that includes a hard processor and an FPGA. The two security labels to be used may include "normal" and "secure" respectively. The access permissions associated with the security labels may be set up such that components of an integrated circuit associated with the normal security label can only interact with other components assigned the normal security label and not with components assigned the secure security label. In addition, access permissions associated with the secure security label may allow components tagged with the secure security label to access any components of the integrated circuit but allow no access to external components. The access permissions associated with the normal and secure labels may be assigned to a normal world OS and a secure world OS, normal and secure instances of an OS, or normal and secure user accounts of an OS respectively. A user may use SEC application 406 that generates an interactive schematic for the system on chip to assign security labels to one or more components of the integrated circuit that are available in the schematic. SEC application 406 then generates a first handoff file. The handoff file is a binary blob containing information pertaining to the security labels assigned to the various components. The handoff file is sent to the bootloader of the system on chip. The bootloader then loads the secure world OS, which in turns launches a secure monitor 420. Secure monitor 420 then launches a non-secure bootloader that loads the normal world OS. In an embodiment, secure monitor 420 has higher boot priority than first OS 416, second OS 418, and the system bootloader. In an embodiment, secure monitor 420 is booted first and secure monitor 420 then launches the bootloader or various operating systems. The secure world OS and normal world OS receive handoff files from SEC application 406, which provide them with information pertaining to components of the system on chip, that are available to each OS.

In an embodiment, a TEE is setup by partitioning the set of system components of integrated circuit 100 into non-overlapping subsets based on assigning security labels to one or more system components. The description above of FIG. 4 relates to only one of two security labels being applied to each of the system components and hence partitioning the set of system components of integrated circuit 100 into two non-overlapping subsets. Persons skilled in the art would appreciate that the same technique could be extended to tag many components with many different security labels and create many different subsets based on those security labels.

Figure 6:
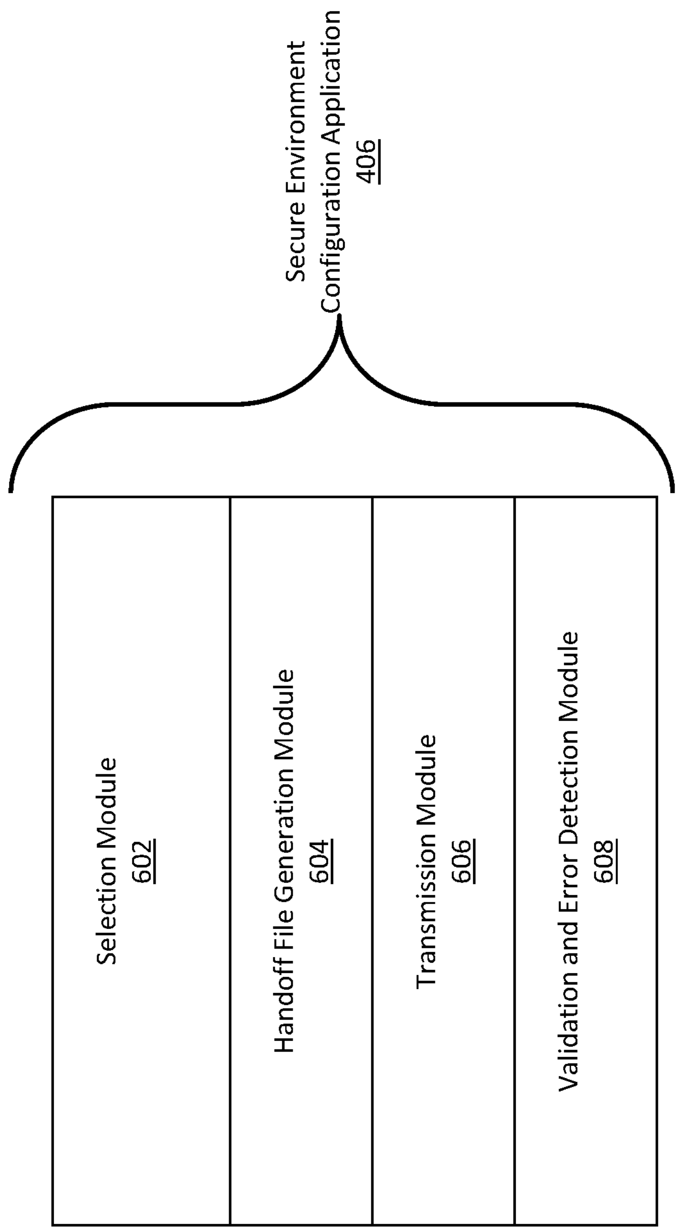
FIG. 6 illustrates an exemplary secure environment configuration application implemented on a computer system in accordance with an embodiment of the present invention.

FIG. 6 illustrates SEC application 406 implemented on computer system 300 in accordance with an embodiment of the present invention. For the purpose of illustrating clear examples, FIG. 6 will be discussed in reference to FIG. 4 and FIG. 5.

Referring now to FIG. 6, SEC application 406 may be implemented as specialized software on computer system 300 to authenticate the embedded firmware stored on integrated circuit 100. SEC application 406 may also be implemented as a part of a software suite or application used for configuring integrated circuit 100 as described in FIG. 2. For example, SEC application 406 may be a software module of a computer aided design (CAD) application or electronic design automation (EDA) application for generating a configuration bitstream for a FPGA as described in FIG. 2. In an embodiment, SEC application 406 may include selection module 602, handoff file generation module 604, transmission module 606, and validation and error detection module 608.

Referring again to FIG. 6, selection module 602 may generate and display an interactive system or circuit diagram for integrated circuit 100, for example the interactive schematic view 502 of FIG. 5, using display 312 of computer system 300. In an embodiment, selection module 602 may allow a user to assign a security label to a component of integrated circuit 100 by using input device 314 of computer system 300. For example, assigning 'secure' security label to a UART controller may include using a mouse and keyboard to select 'secure' security label from a graphical user interface (GUI) menu of selection module 602 followed by selecting the UART controller on interactive schematic design 502 to assign the UART controller the 'secure' security label.

Referring again to FIG. 6, the handoff file generation module 604 generates handoff files 422, 424, and 426 that may be consumed by bootloader/system monitor 420 of integrated circuit 100. As described above, handoff files 422, 424, and 426 are binary blobs that include information pertaining to security labels assigned to the various components of integrated circuit 100. In an embodiment, handoff file generation module 604 may receive the user input via selection module 602 and associate first security label 504 and second security label 506 with the appropriate system components by manipulating the appropriate registers. This in turn will create first subset 408 and second subset 410 of system components.

Referring again to FIG. 6, transmission module 606 sends handoff files 422, 424, and 426 to first OS 416, second OS 418, and bootloader/system monitor 420, respectively. In an embodiment, transmission module 606 sends handoff files 422, 424, and 426 across network link 320 to integrated circuit 100. In an embodiment, transmission module 606 sends handoff files 422, 424, and 426 simultaneously to integrated circuit 100. In another embodiment, transmission module 606 first sends handoff file 426 to bootloader/system monitor 420. After bootloader/system monitor 420 loads first OS 416 and second OS 418 as described in the above sections, a confirmation is sent to transmission module 606. Transmission module 606 then sends handoff files 422 and 424 to first OS 416 and second OS 418 respectively.

Referring again to FIG. 6, validation and error detection module 608 validates and determines errors in the partitioning of system components of integrated circuit 100 into first subset 408 and second subset 410 to ensure that both partitions are operational when loaded onto the OSs of integrated circuit 100. For example, integrated circuit 100 may have two CPUs (CPU0 and CPU1), each of which is assigned a different security label (CPU0 is assigned first security label 504 and CPU1 is assigned second security label 506). Then validation and error detection module 608 checks the rest of the system components that have been partitioned into first subset 408 and second subset 410 to make sure that adequate memory has been assigned to each subset (a CPU typically cannot operate without memory). This prevents system errors when first and second subsets 408 and 410 are loaded onto first OS 416 and second OS 418 respectively. In an embodiment, the validation and error detection is completed prior to generation of handoff files. In an embodiment, validation and error detection module 608 may simulate loading of first and second subsets 408 and 410 onto first and second OSs 416 and 418 respectively to detect errors and validate the partitions. In an embodiment, validation and error detection module 608 generates a security risk notification in case of improperly divided first subset 408 and second subset 410. In an embodiment, the security risk notification may be transmitted to the user via a GUI element.

Figure 7:
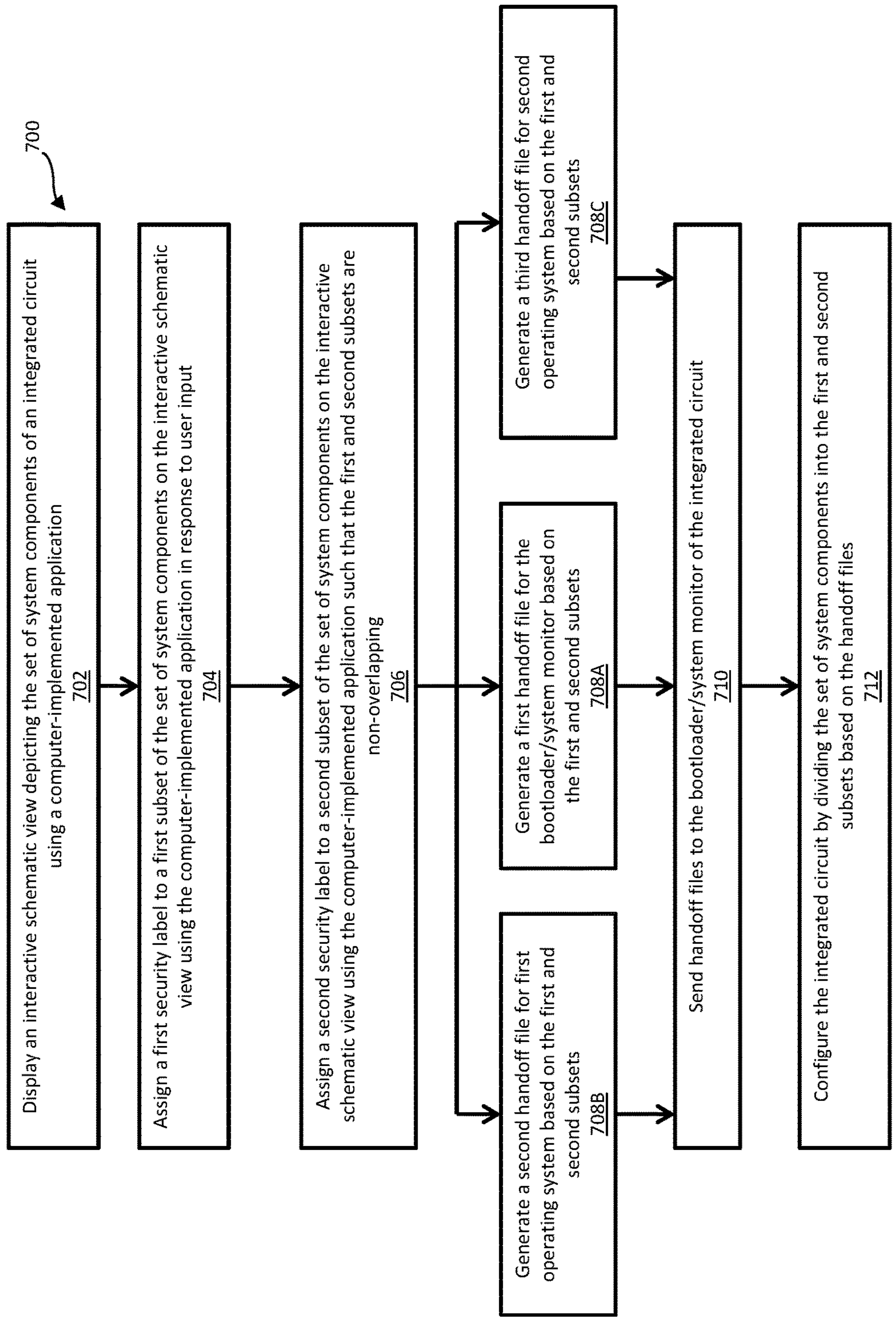
FIG. 7 illustrates an exemplary method of partitioning components according to different security labels in accordance with an embodiment of the present invention.

FIG. 7 illustrates an exemplary method 700 of partitioning components according to different security labels in accordance with an embodiment of the present invention. For the purpose of illustrating clear examples, FIG. 7 will be discussed with reference to FIG. 4, FIG. 5, and FIG. 6.

Referring now to FIG. 7, at step 702, SEC application 406 displays interactive schematic view 502 of integrated circuit 100. Interactive schematic view 502 depicts a set of components of integrated circuit 100 to a user. As described above, SEC application 406 may be implemented on computer system 300 as a part of EDA tools described in FIG. 2.

At step 704, SEC application 406 assigns first security label 504 to first subset 408 of the set of system components on interactive schematic view 502 using the computer-implemented SEC application 406 in response to user input. In an embodiment, the security labels are assigned to various components to reflect the intended design of integrated circuit 100 by the user. For example, the user may select a security label "secure" from a set of security labels that includes, "secure" and "normal." As described above, these labels may represent different security labels, access permissions, and associations with OSs accredited with different security labels. In this example, components with the "normal" security label are less secure (less permissive, more restrictions on access, sharing etc.) as compared to the components assigned the "secure" label.

At step 706, SEC application 406 assigns second security label 506 to second subset 410 of the set of system components on interactive schematic view 502 using the computer-implemented SEC application 406 in response to user input such that first and second subsets 408 and 410 are non-overlapping. In an embodiment, subsets 408 and 410 may still share resources. For example, they may be assigned the same memory circuit; however, the memory space of the memory circuit will be partitioned in two non-overlapping subsets so that the same addresses are not shared between the components of subsets 408 and 410.

At step 708A, SEC application 406 generates a first handoff file for bootloader/system monitor 420 based on partitioning of components of integrated circuit 100 into first and second subsets 408 and 410. At step 708B, SEC application 406 generates a second handoff file for first OS 416 based on partitioning of components of integrated circuit 100 into first and second subsets 408 and 410. At step 708C, SEC application 406 generates a third handoff file for second OS 418 based on partitioning of components of integrated circuit 100 into first and second subsets 408 and 410. In an embodiment, the first, second, and third handoff files are handoff files 422, 424, and 426 respectively. In an embodiment, handoff files 422, 424, and 426 are generated in parallel with each other. In another embodiment, handoff file 422 is generated first as described in above sections. In an embodiment, the second and third handoff files only contain information pertaining to components in first and second subsets 408 and 410 respectively.

At step 710, SEC application 406 sends handoff files 422, 424, 426 to bootloader/system monitor 420 of integrated circuit 100. In an embodiment, handoff files 422, 424, 426 are transmitted together to integrated circuit 100. In another embodiment, handoff file 422 is transmitted first to integrated circuit 100.

At step 712, integrated circuit 100 is configured by dividing the set of system components into first subset 408 and second subset 410 based on the handoff files 422, 424, and 426. In an embodiment, the configuration process of integrated circuit 100 is similar to the configuration process described in relation to FIG. 1 and FIG. 2.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims.

I claim:

1. A method of dividing a set of components of an integrated circuit comprising:

receiving, using a computer-implemented application, information regarding first and second non-overlapping subsets of the set of components, wherein the information indicates that each component in the first non-overlapping subset is assigned by a user of the computer-implemented application to a first security label, and wherein the information further indicates that each component in the second non-overlapping subset is assigned by the user to a second security label;

generating, using the computer-implemented application, a first system handoff file based on the information regarding the first and second non-overlapping subsets;

sending, using the computer-implemented application, the first system handoff file to a system monitor of the integrated circuit; and dividing, using the system monitor, the set of components of the integrated circuit according to the first and second security labels based on the first system handoff file.

2. The method as defined in claim 1, wherein the integrated circuit is a programmable logic device.

3. The method as defined in claim 1, wherein the integrated circuit is an application specific integrated circuit, an application-specific standard product, a field-programmable gate array, or a complex programmable logic device.

4. The method as defined in claim 1, wherein at least one of the first and second non-overlapping subsets is empty.

5. The method as defined in claim 1, wherein the first and second security labels are normal and secure, respectively.

6. The method as defined in claim 1, wherein the first system handoff file is a binary blob containing a list of each component of the set of components and a security label associated with the each component.

7. The method as defined in claim 1, wherein the second security label designates a higher level of security than the first security label.

8. The method as defined in claim 7, wherein each component of the second non-overlapping subset is inaccessible by the first non-overlapping subset.

9. The method as defined in claim 7, wherein each component of the second non-overlapping subset is inaccessible by an external system.

10. The method as defined in claim 1, wherein each component in the first non-overlapping subset is accessible by a first security label operating system.

11. The method as defined in claim 10 further comprising:

generating, using the computer-implemented application, a second system handoff file, wherein the second system handoff file includes the each component in the first non-overlapping subset; and sending, using the computer-implemented application, the second system handoff file to the first security label operating system.

12. The method as defined in claim 10, wherein each component in the second non-overlapping subset is accessible by a second security label operating system.

13. The method as defined in claim 12 further comprising:

generating, using the computer-implemented application, a third system handoff file, wherein the third system handoff file includes the each component in the second non-overlapping subset; and sending, using the computer-implemented application, the third handoff file to the second security label operating system.

14. The method as defined in claim 1 further comprising:

validating, using the computer-implemented application, the first and second non-overlapping subsets of the set of components.

15. The method as defined in claim 1 further comprising:

generating, using the computer-implemented application, a security risk notification in case of improperly divided first and second non-overlapping subsets of the set of components.

16. The method as defined in claim 1, wherein the first and second security labels are selected from a plurality of security labels.

17. The method as defined in claim 16, wherein each subset of a plurality of non-overlapping subsets of the set of components is assigned a security label from the plurality of security labels.

18. A method of assigning a plurality of security labels to a set of components of an integrated circuit comprising:

displaying, using a computer-implemented application, an interactive system design depicting the set of components;

assigning, using the computer-implemented application, a first security label of the plurality of security labels to a first subset of the set of components in response to user input;

assigning, using the computer-implemented application, a second security label of the plurality of security labels to a second subset of the set of components in response to user input, wherein the first and second subsets are non-overlapping; and generating, using the computer-implemented application, a first system handoff file for a system monitor of the integrated circuit based on the first and second subsets of the set of components.

19. The method as defined in claim 18, further comprising:

generating, using the computer-implemented application, a second system handoff file for a first security label operating system; and generating, using the computer-implemented application, a third system handoff file for a second security label operating system.

20. A non-transitory computer-readable storage medium storing one or more sequences of instructions, which instructions, when executed by at least one processor, causes the at least one processor to perform a method of dividing a set of components of an integrated circuit comprising:

receiving information regarding first and second non-overlapping subsets of the set of components, wherein the information indicates that each component in the first non-overlapping subset is assigned by a user of the processor to a first security label, and wherein the information further indicates that each component in the second non-overlapping subset is assigned by the user to a second security label;

generating a system handoff file based on the information regarding the first and second non-overlapping subsets;

sending the system handoff file to a system monitor of the integrated circuit; and dividing, using the system monitor, the set of components of the integrated circuit according to the first and second security labels based on the system handoff file.

* * * * *